United States Patent [19]

Shimada et al.

[11] 4,077,960
[45] Mar. 7, 1978

[54] IMIDO-QUINOLINE DYES

[75] Inventors: Keizo Shimada; Toshiaki Harada; Masahiro Koga, all of Hino, Japan

[73] Assignee: Teijin Limited, Osaka, Japan

[21] Appl. No.: 694,034

[22] Filed: Jun. 8, 1976

[30] Foreign Application Priority Data

Jun. 12, 1975  Japan .................. 50-70220
Jun. 12, 1975  Japan .................. 50-70221
Jun. 13, 1975  Japan .................. 50-70752

[51] Int. Cl.² ............... C07D 401/04; D06P 1/649
[52] U.S. Cl. ................ 260/281 NH; 260/239.3 T; 260/287 CF; 106/288 Q
[58] Field of Search ................. 260/281 NH

[56] References Cited

U.S. PATENT DOCUMENTS

| 3,399,028 | 8/1968 | Illy | 260/289 QP |
| 3,622,583 | 11/1971 | Dehnert | 260/287 F |
| 3,947,452 | 3/1976 | Wade et al. | 260/281 NH |

FOREIGN PATENT DOCUMENTS 480,406  12/1969  Switzerland ........... 260/289 QD

Primary Examiner—R. J. Gallagher
Assistant Examiner—Mark L. Berch

Attorney, Agent, or Firm—Wenderoth, Lind & Ponack

[57] ABSTRACT

A compound of the formula

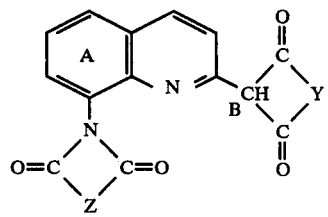

wherein Y represents an arylene group optionally substituted by a halogen atom, an arylsulfonyl group or an acyl group, Z represents a 1,2-naphthylene, 2,3-naphthylene, 1,8-naphthylene or 2, 2'-biphenylene group optionally substituted by a halogen atom, and either one or both of the rings A and B optionally contain a substituent. This compound can be obtained by reacting a quinoline derivative with an aryldicarboxylic acid or its reactive derivative, and if desired, halogenating the resulting product. A yellow organic pigment comprising this compound as a coloring ingredient is useful for coloring polymeric materials.

10 Claims, No Drawings

IMIDO-QUINOLINE DYES

This invention relates to quinoline derivatives, and more specifically, to novel quinoline derivatives, a process for their preparation, and their use as coloring agents.

A number of quinoline derivatives, particularly quinophthalone compounds, have been known heretofore. For example, United States Patent 3,622,583 suggests compounds of the following formula

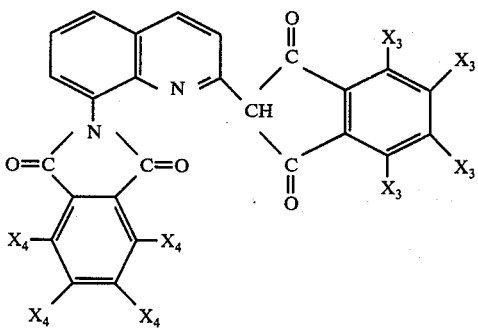

wherein $X_3$ and $X_4$, independently from each other, represent a chlorine or bromine atom, as yellow dyes. These quinoline derivatives suggested heretofore do not possess sufficient thermal stability and weatherability, and suffer from a defect of discoloration when used in the melt shaping of polymeric materials, for example.

It is an object of this invention to provide novel quinoline derivatives having superior thermal stability and weatherability.

Another object of this invention is to provide a process for preparing novel quinoline derivatives having superior thermal stability and weatherability.

Still another object of this invention is to provide yellow pigment having superior thermal stability and weatherability.

Still another object of this invention is to provide polymeric materials colored by this pigment.

The other objects and features of the present invention will become apparent from the following description.

According to this invention, there is provided a compound of the following formula

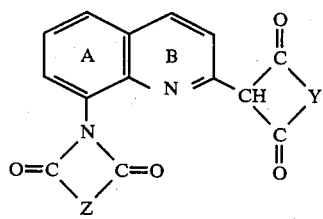

(I)

wherein Y represents an arylene group optionally substituted by a halogen atom, an arylsulfonyl group or an acyl group, Z represents a 1,2-naphthylene, 2,3-naphthylene, 1,8-naphthylene or 2,2'-biphenylene group optionally substituted by a halogen atom, and either one or both of the rings A and B optionally contain a substituent.

In the above formula, the arylene group is a mononuclear or polynuclear divalent aromatic group in which the two bonds are present at the ortho- or peripo-sition of the aromatic ring, for example, phenylene, naphthylene, or anthracenylene. In particular, 1,2-phenylene, 1,2-naphthylene, 2,3-naphthylene, and 1,8-naphthylene are suitable. Of these, 1,2-phenylene is especially preferred. The arylene group is either unsubstituted, or substituted by at least one halogen atom or arylsulfonyl or acyl group. Arylene groups substituted by 1 to 6, preferably 1 to 4, halogen atoms are especially suitable.

The halogen atom in formula (I) includes chlorine, bromine, fluorine and iodine atoms, and the chlorine and bromine atoms are especially preferred. The arylsulfonyl group in formula (I) preferably includes, for example, substituted or unsubstituted benzenesulfonyl groups, such as a benzenesulfonyl group, p-toluenesulfonyl group, p-chlorobenzenesulfonyl group, or p-bromobenzenesulfonyl group. The acyl group in formula (I) means an atomic grouping resulting from the removal of OH from the carboxyl group of a carboxylic acid, and generally, those represented by the formula R—CO— or —CO—R'—CO— are conveniently used. In these formulae, R is a monovalent hydrocarbon group suitably containing up to 10 carbon atoms, preferably lower alkyl groups containing up to 5 carbon atoms or a phenyl group. R' represents a divalent hydrocarbon group preferably containing up to 10 carbon atoms, especially a phenyl group. Examples of suitable acyl groups are acetyl, propionyl, benzoyl, and phthaloyl.

The group Y is suitably a 1,2-phenylene, 1,2-naphthylene, 2,3-naphthylene or 1,8-naphthylene group substituted by 1 to 6, preferably 1 to 4, halogen atoms which are identical to or different from each other.

The group Z is a 1,2-naphthylene, 2,3-naphthylene, 1,8-naphthylene or 2,2'-biphenylene group which is unsubstituted, or substituted by at least 1, preferably 1 to 6, especially 1 to 4, halogen atoms that are identical to or different from each other. Of these, the 1,8-naphthylene group, unsubstituted or substituted by at least 1, preferably 1 to 6, more preferably 1 to 4, halogen atoms, is preferred.

The rings A and B are preferably unsubstituted, but may be substituted by at least one substituent. Examples of the substituent include halogen atoms such as chlorine or bromine; lower alkyl groups containing 1 to 5 carbon atoms such as methyl, ethyl, n- or iso-propyl, or n-, iso-, or tert-butyl; lower alkoxy groups containing 1 to 5 carbon atoms such as methoxy, ethoxy, n- or iso-propoxy, or n-, iso- or tert-butoxy; aryl groups such as a phenyl group; acyl groups, for example, alkanoyl groups such as lower alkanoyl groups containing 1 to 4 carbon atoms (e.g., acetyl or propionyl) or aroyl groups (e.g., benzoyl or phthaloyl); and a sulfonic acid group ($SO_3H$), a carboxyl group, or metal salts of these groups, particularly alkaline earth metal (e.g., Ca and Ba) salts.

These substitutents can be present on at least one of the 4-, 5- and 6-positions of the quinoline ring. Of the above-mentioned substituents, halogen atoms, lower alkyl groups, lower alkoxy groups, and a phenyl group are preferred. The halogen atoms and lower alkyl groups are especially preferred.

The compounds of formula (I) provided by the present invention can form tautomeric structures shown by the following formulae.

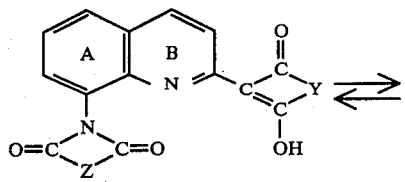

(I-a)

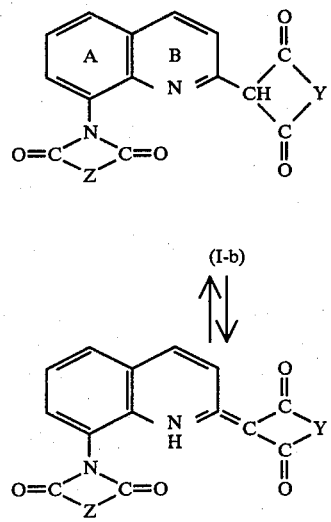

(I-b)

(I-c)

It is to be understood that in the present specification and the appended claims, the structural formula (I) is meant to include all of the tautomeric structures of formulae (I-a), (I-b) and (I-c).

Of the compounds of formula (I) provided by the present invention, preferred species are those of the following formula

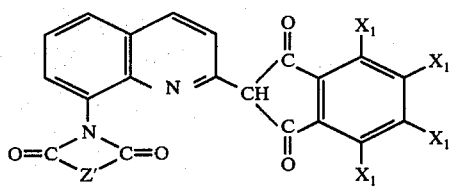

(I-d)

wherein $X_1$ is a halogen atom, especially a chlorine or bromine atom, and Z' is a 1,2-naphthylene, 2,3-naphthylene, or 1,8-naphthylene group optionally substituted by 1 to 6, particularly 1 to 4, halogen atoms.

Most preferred species are those of the following formula

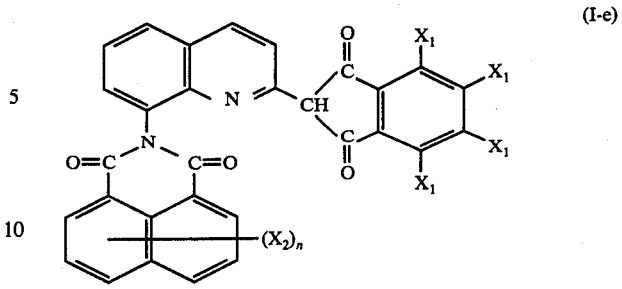

(I-e)

wherein $X_1$ is the same as defined above, $X_2$ is a halogen atom, particularly a chlorine or bromine atom, and n is an integer of 0 to 6, especially 0 to 4.

Typical examples of the compounds of formula (I), (I-d), or (I-e) of this invention are listed below.

(1) 2-[4',5',6',7'-tetrachloro(or tetrabromo)-1',3'-indanedionyl-2']-8-naphthalimidoquinoline;

(2) 2-[4',5',6',7'-tetrachloro(or tetrabromo)-1',3'-indanedionyl-2']-4-methyl-8-naphthalimidoquinoline;

(3) 2-(5',6'-benzo-1',3'-indanedionyl-2')-8-naphthalimidoquinoline;

(4) 2-(1',3'-indanedionyl-2')-8-(3' or 4'-bromonaphthalimido)quinoline;

(5) 2-[5',6'-(1'',4''-dibromobenzo)-1',3'-indanedionyl-2']-8-naphthalimidoquinoline;

(6) 2-(4',5',6',7'-tetrachloro-1',3'-indanedionyl-2')-8-tetrabromonaphthalimidoquinoline;

(7) 2-(5',6'-benzo-tetrabromo-1',3'-indanedionyl-2')-8-naphthalimidoquinoline;

(8) 2-(4',5',6',7'-tetrabromo-1',3'-indanedionyl-2')-8-dibromonaphthalimidoquinoline;

(9) 2-(4',5'-benzo-dibromo-1',3'-indanedionyl-2')-8-naphthalimidoquinoline;

(10) 2-(4',5'-benzo-1',3'-indanedionyl-2')-8-tetrachloronaphthalimidoquinoline;

(11) 2-[5',6'-(p-bromobenzenesulfonyl)-benzo-1',3'-indanedionyl-2']-8 -naphthalimidoquinoline;

(12) 2-[5',6'-(benzenesulfonyl)-benzo-1',3'-indanedionyl-2']-8 -tetrabromonaphthalimidoquinoline;

(13) 2-[5',6'-benzo-tetrachloro(or tetrabromo)-1',3'-indanedionyl-2']-8-naphthalimidoquinoline;

(14) 2-(4',5'-benzotetrahydronaphthalene-1',3'-dionyl-2')-8-naphthalimidoquinoline;

(15) 2-[4',5'-benzo-bromo(or chloro)-tetrahydronaphthalene-1',3'-dionyl-2']-4-methyl-8-naphthalimidoquinoline;

(16) 2-[4',5',6',7'-tetrabromo(or tetrachloro)-1',3'-indanedionyl-2']-8-(5',8'-dibromonaphthalene-2',3'-dicarboximido)quinoline;

(17) 2-(1',3'-indanedionyl-2')-8-[dichloro)(or dibromo)-naphthalene-2',3'-dicarboximido]quinoline;

(18) 2-(1',3'-indanedionyl-2')-8-[tetrabromo(or tetrachloro)-naphthalene-2',3'-dicarboximido]quinoline;

(19) 2-[5'6'-benzo-dichloro(or dibromo)-1',3'-indanedionyl-2']-8-[dichloronaphthalene -2',3'-dicarboximido]quinoline;

(20) 2-[5',6'-benzo-tetrabromo(or tetrachloro)-1',3'-indanedionyl-2']-8-[tetrachloronaphthalene-2',3'-dicarboximido]quinoline;

(21) 2-[4',5'-benzo-dichloro(or dibromo)-1',3'-indanedionyl-2']-8-[dichloro(or dibromo)naphthalene-2',3'-dicarboximido]quinoline;

(22) 2-[4',5'-benzo-dichloro(or dibromo)-tetrahydronaphthalene-1',3'-dionyl-2']-8-[dichloro(or dibromo)-naphthalene-2',3'-dicarboximido]quinoline;

(23) 2-(4',5',6',7'-tetrachloro-1',3'-indanedionyl2')-4-methyl-8-(5',8'-dibromonaphthalene-2',3'-dicarboximido) quinoline;

(24) 2-(4',5',6',7'-tetrachloro-1',3'-indane-dionyl-2')-6-bromo-8-(5',8'-dibromonaphthalene-2',3'-dicarboximido) quinoline;

(25) 2-(4',5',6',7'-tetrachloro-1',3'-indanedionyl-2')-4-methoxy-8-(tetrabromonaphthalene-2',3'-dicarboximido) quinoline;

(26) 2-[4',5',6',7'-tetrachloro(or tetrabromo)-1',3'-indanedionyl-2']-8-(dibromonaphthalene-1',2'-dicarboximido) quinoline;

(27) 2-(1',3'-indanedionyl-2')-8-[dichloro(or dibromo)-naphthalene-1,2-dicarboximido]quinoline;

(28) 2-[5',6'-benzo-tetrachloro(or tetrabromo)-1',3'-indanedionyl-2']-8-[tetrachloro(or tetrabromo)-naphthalene-1',2'-dicarboximido]quinoline;

(29) 2-[4',5'-benzo-dichloro(or dibromo)-1',3'-indanedionyl-2']-8-[dichloro(or dibromo)-naphthalene-1',2'dicarboximido]quinoline;

(30) 2-[4',5'-benzotetrahydrodichloro(or dibromo) naphthalene-1',3'-dionyl]-8-[dichloro(or dibromo)-naphthalene-1',2'-dicarboximido]quinoline;

(31) 2-(4',5',6',7'-tetrachloro-1',3'-indanedionyl-2')-4-methyl(or methoxy)-8-[dibromonaphthalene-1',2'-dicarboximido]quinoline;

(32) 2-[4',5',6',7'-tetrachloro(or tetrabromo)-1',3'-indanedionyl-2']-8-diphenimidoquinoline;

(33) 2-(benzoyl-1',3'-indanedionyl-2')-8-naphthalimidoquinoline;

(34) 2-(6',7'-phthaloyl-1',3'-indanedionyl-2')-8-naphthalimidoquinoline; and

(35) 2-(4',5',6',7'-tetrachloro-1',3'-indanedionyl-2')-5-sulfo-8-naphthalimidoquinoline.

The compound of formula (I) can be easily produced, for example by reacting a quinoline derivative of the formula

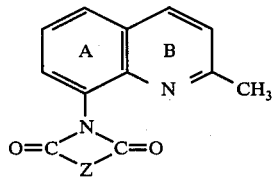

(II)

wherein Z and the rings A and B are the same as defined hereinabove, with an aryldicarboxylic acid of the following formula

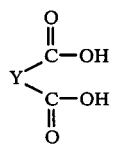

(III)

wherein Y is the same as defined hereinabove, or its reactive derivative, and if desired, halogenating the resulting product.

The reaction between the quinoline derivative of formula (II) and the aryldicarboxylic acid of formula (III) or its reactive derivative may be carried out in the absence of solvent. Generally, however, it is performed in the presence of a solvent. Useful solvents are organic solvents inert under the reaction conditions, for example, hydrocarbons such as decaline, tetralin or trimethylbenzene; halogenated hydrocarbons such as dichlorobenzene, trichlorobenzene or chloronaphthalene; nitrated hydrocarbons such as nitrobenzene; ethers such as diphenyl ether; and N-methylpyrrolidone.

The reaction is carried out generally under heat. The heating temperature can be varied over a wide range according, for example, to the types and proportions of the starting materials, or the type of the solvent. Usually, it is 100° to 350° C, preferably 150° to 300° C. The reaction pressure is usually normal atmospheric pressure, but if desired, the reaction may be performed at a reduced or elevated pressure. Within the above temperature range, the reaction ends generally in 2 to 10 hours.

The proportions of the quinoline derivative of formula (I) and the aryldicarboxylic acid of formula (II) or its reactive derivative are not critical, but can be varied over a wide range according, for example, to the starting materials or the reaction conditions. It is generally advantageous that the aryldicarboxylic acid or its reactive derivative is used in an amount at least equimolar to the quinoline derivative, preferably in a somewhat excessive amount (1.2 to 3 molar times), especially about 1.5 molar times.

The reaction sufficiently proceeds by heating the two starting materials under the above reaction conditions, but advantageously, the reaction could be carried out in the presence of a catalytic amount of a FriedelCrafts catalyst, such as zinc chloride, aluminium chloride, antimony pentoxide, iron trichloride, tin tetrachloride, or titanium tetrachloride. This is especially required when the reaction temperature is relatively low, for example, not more than about 250° C, because at such temperatures, the rate of the reaction decreases.

The quinoline derivative of formula (II) used as a starting material is a novel compound, and can be prepared, for example, by reacting an 8-aminoquinaldine derivative of the following formula

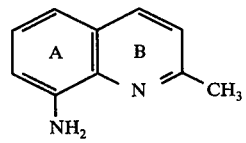

(IV)

wherein the rings A and B are the same as defined hereinabove, with an aryldicarboxylic acid of the following formula

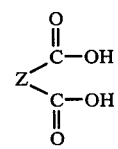

(V)

wherein Z is the same as defined hereinabove.

The reaction between the compound of formula (IV) and the compound of formula (V) can be performed by heating these compounds in the absence of a solvent, or preferably in the presence of a solvent of the type described hereinabove. Generally, this reaction is carried out under milder reaction conditions than the reaction conditions used to react the quinoline derivative of formula (II) with the aryldicarboxylic acid of formula (III) or its reactive derivative. For example, the heating temperature is generally 100° to about 250° C. But when the reaction temperature increases, not only will the amino group at the 8-position of the compound of formula (IV) be condensed with the compound of formula (V), but also there will be an increasing tendency for the methyl group at the 2-position to be attacked by the compound of formula (V). When such a high reaction temperature is used, appropriate measures, such as the shortening of the reaction time, are taken to produce the compound of formula (II) predominantly. This reaction does not require catalysts.

The ratio between the compound of formula (IV) and the compound of formula (V) is not critical, but advantageously, the molar ratio of the former to the latter is adjusted to about 1:1 to about 1:1.2.

The compound of formula (II) so prepared may be used in the reaction of forming the quinoline derivative in accordance with this invention, either directly without isolation, or after isolation.

According to another aspect of this invention, compounds of the following formula

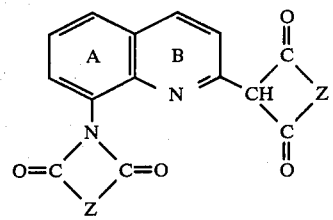

(I-f)

wherein Z and the rings A and B are the same as defined hereinabove, can be directly prepared from the 8-aminoquinaldine derivative of formula (IV) using the aryldicarboxylic acid of formula (V) or its reactive derivative as the aryldicarboxylic acid of formula (III) or its reactive derivative. The compounds of formula (I-f) above correspond to those of formula (I) in which Y is the same as Z.

In this case, the 8-aminoquinaldine derivative of formula (IV) can be reacted with the aryldicarboxylic acid of formula (V) or its reactive derivative under the same reaction conditions as described hereinabove with regard to the reaction of the quinoline derivative of formula (II) with the aryldicarboxylic acid of formula (III) or its reactive derivative. The ratio between the compound of formula (IV) and the compound of formula (V) is not critical, but advantageously, at least 2 moles (preferably up to about 6 moles) of the compound of formula (V) is used per mole of the compound of formula (IV).

Typical examples of the 8-aminoquinaldine derivatives of formula (IV) used as a starting material in the above-mentioned reaction are 8-aminoquinaldine, 4-methyl-8-aminoquinaldine, 4-methoxy-8-aminoquinaldine, 4-bromo-8-aminoquinaldine, 6-bromo-8-aminoquinaldine, 5-sulfinyl-8-aminoquinaldine, and 6-methyl-8-aminoquinaldine.

Examples of the aryldicarboxylic acids of formula (III) or (V) to be reacted with the 8-aminoquinaldine derivative of formula (IV) or the quinoline derivative of formula (II) include naphthalene-2,3-dicarboxylic acid, 5,8-dibromo(or dichloro)naphthalene-2,3-dicarboxylic acid, 5,6,7,8-tetrabromo(or tetrachloro)naphthalene-2,3-dicarboxylic acid, 1,2-naphthalene-dicarboxylic acid, dichloro(or dibromo)-naphthalene-1,2-dicarboxylic acid, naphthalic acid, 3-chloro(or bromo)naphthalic acid, 4-chloro(or bromo)naphthalic acid, 4,5-dibromonaphthalic acid, hexabromonaphthalic acid, benzenesulfonylnaphthalene-2,3-dicarboxylic acid and 2,2'-diphenic acid.

Phthalic acid, tetrachloro(or tetrabromo)phthalic acid, and 6',7'-phthaloyl-phthalic acid are cited as other examples of the compound of formula (III) in addition to the above examples.

Advantageously, the reactive derivatives of these aryldicarboxylic acids include anhydrides or esters, especially lower alkyl esters.

If desired, the compound of formula (I) so obtained can be halogenated.

The halogenation can be carried out in accordance with a customary ring-halogenation of aromatic compounds. Halogenating agents used for this purpose are ordinary ring-halogenating agents such as halogen elements, e.g., chlorine or bromine, and antimony pentachloride.

The halogenation can be carried out in an ordinary inert organic solvent at a temperature of generally 0° to 150° C.

The resulting compound of formula (I) can be separated from the reaction mixture, and purified by any methods known per se. For example, the reaction mixture after the reaction is cooled, and the resulting precipitate is separated and recovered by, for example, filtration, or centrifugal separation. The compound of formula (I) so recovered has sufficiently high purity, and can be used in applications to be described below. It may, if desired, be further purified by washing with an organic solvent, for example, alcohols such as methanol or ethanol, ketones such as acetone or methylethyl ketone, or amides such as dimethyl formamide or dimethylacetamide.

The compound of formula (I) can be subjected to a pigment-forming treatment by a method known in the art of pigment chemistry. For example, the compound is dissolved in conc. sulfuric acid, and the solution is poured into water to re-precipitate the compound in the form of fine powder. Or the compound is finely pulverized by a pulverizer such as a ball mill.

The compounds of formula (I) provided by the present invention have yellow colors, and superior thermal stability, weatherability and resistance to migration. These properties enable the compounds to be advantageously used as a coloring component of yellow organic pigments.

Compounds of formula (I) in which Z is a 1,8-naphthylene group optionally substituted by a halogen atom have high chemical resistance as well as superior thermal stability, weatherability and resistance to migration, and are especially advantageous in that they are not affected by chemicals frequently used as resin additives, for example, zinc stearate.

The compounds of formula (I) of this invention are useful as yellow organic pigments, and just the same as ordinary organic pigments, can be used in a wide range of applications, for example, for coloring polymeric shaped articles, or as coloring components of paints, printing inks, crayon, painting pastes, or textile printing pastes.

In particular, the compounds of formula (I) of this invention can be advantageously used for coloring polymeric materials. Examples of such polymeric materials include polyolefin, polystyrene, polyacrylic, polyvinyl, polyamide, polyester, polyacetal, polycarbonate, amino, regenerated cellulose, epoxy, phenolic, urea, melamine, and polyimide resins.

In the present specification and the appended claims, the term "polymeric material" is meant to include not only shaped articles prepared from the above resins, but also compositions containing these resins as a binder, carrier, or vehicle, etc., for example, paints, printing inks and textile printing pastes.

One procedure available for coloring a shaped article of a resin using the compound of formula (I) comprises incorporating the compound of formula (I) in the desired amount (for example, 0.05 to 1 part by weight, preferably 0.1 to 0.5 part by weight, per 100 parts by weight of the resin) in the resin, melting or melt-kneading the blend, and fabricating it into a desired shape such as a film, sheet, plate, pipe, tube, filament, or pellet by a conventional resin fabricating method such as compression molding, injection molding, calendering, or extrusion. According to another method, the compound of formula (I) is incorporated in advance into monomers or prepolymers for forming the resin, and the mixture is polymerized, and fabricated to form a colored shaped article of the resin in the above-mentioned form (the cast shaping method).

The compound of formula (I) can also be used to color fibers, woven or knitted fabrics, or nonwoven fabrics. It can be applied by a dip dyeing method just as in the case of disperse dyes, or by a textile printing technique.

The following Examples and Comparative Examples further illustrate the present invention.

EXAMPLE 1

(1-a) 198 parts of 1,8-naphthalenedicarboxylic anhydride and 2,000 parts of trichlorobenzene were added to 158 parts of 8-aminoquinaldine, and the mixture was stirred under reflux at about 220° C and atmospheric pressure for 3 hours.

(1-b) Then, 286 parts of tetrachlorophthalic anhydride and 40 parts of anhydrous zinc chloride were added to the resulting reaction mixture, and the mixture was reacted for 3 hours under reflux at atmospheric pressure.

(1-c) Then, 300 parts of dimethyl formamide was added, and the mixture was stirred for about 1 hour under reflux at atmospheric pressure. The product was cooled, and separated by filtration. The resulting product (yellow crystals) was thoroughly washed with 1,000 parts of dimethyl formamide and then with ethanol, and dried to afford 472 parts of a powdery yellow pigment. It had a melting point of more than 360° C, and exhibited an absorption maximum in the visible region of 444 mμ in its dimethyl formamide solution. The infrared absorption spectroscopic analysis of the product showed that it had characteristic absorptions at 1,725 cm$^{-1}$ and 1,720 cm$^{-1}$ ascribable to the carbonyl of an imide linkage and 1,680 cm$^{-1}$ and 1,630 cm$^{-1}$ by the carbonyl of an indanedione, and the product was identified as 2-(4',5',6',7'-tetrachloro-1',3'-indanedionyl-2')-8-naphthalimidoquinoline of the following formula:

(I-g)

EXAMPLES 2 to 14

The same procedure as in (1-a) in Example 1 was repeated except that instead of the 8-aminoquinaldine and 1,8-naphthalenedicarboxylic acid, the following compounds of formulae (IV-a) and (V-a) were used (IV-a)

(V-a)

(in which $A_1$ and $B_1$ are as indicated in Table 1 below). To the resulting 8-naphthaliminoquinaldine was added a dicarboxylic acid anhydride of the following formula (III-a)

(in which $C_1$ is as indicated in Table 1), and the same procedures as in (1-b) and (1-c) of Example 1 were performed to afford powdery yellow pigments. The infrared absorption spectra and the visible spectrum absorption wavelength of the products are shown in Table 1.

The products obtained were found to be compounds of the following formula:

(I-h)

Table 1

| Example | $A_1$ | $B_1$ | $C_1$ | IR characteristic absorptions (cm$^{-1}$) | Absorption maximum in the visible region [$\lambda$max (m$\mu$)] |
|---|---|---|---|---|---|
| 2 | H | H | tetrabromo-phenylene | 1715, 1705, 1680 1630 | 447 |
| 3 | " | " | 2,3-naphthylene | 1720, 1710, 1760 1630 | 457 |
| 4 | " | " | 5,8-dibromo-2,3-naphthylene | 1710, 1705, 1670 1630 | 459 |
| 5 | " | " | tetrabromo-2,3-naphthylene | 1715, 1705, 1680 1630 | 460 |
| 6 | 4-methyl | " | tetrachloro-phenylene | 1730, 1715, 1670 1630 | 440 |
| 7 | " | 4-chloro | " | 1730, 1720, 1680 1635 | 440 |
| 8 | " | 4-bromo | " | 1735, 1720, 1675 1630 | 440 |
| 9 | H | 3-bromo | tetrachloro-phenylene | 1720, 1680, 1630 | 444 |
| 10 | " | 4-chloro | " | 1725, 1720, 1680 1630 | 444 |
| 11 | " | 3-bromo | 1,2-naphthylene | 1720, 1710, 1680 1630 | 459 |
| 12 | " | H | 1,8-naphthylene | 1725, 1720, 1680 1630 | 430 |
| 13 | " | 4,5-dibromo | tetrachloro-phenylene | 1760, 1740, 1690 1630 | 448 |
| 14 | " | H | p-brom benzen sulphonyl 2,3-naphthylene | 1710, 1705, 1680 1630 | 458 |

EXAMPLES 15 to 22

An 8-aminoquinaldine derivative of the following formula

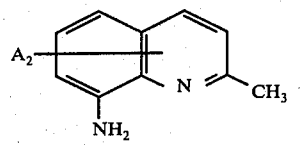

(IV-b)

was reacted with a 2,3-naphthalenedicarboxylic acid anhydride of the following formula

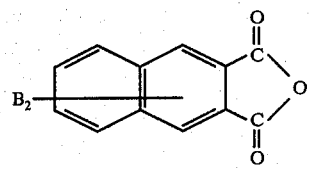

(V-b)

by the same procedure as (1-a) of Example 1. To the resulting reaction mixture, a dicarboxylic acid anhydride of the following formula

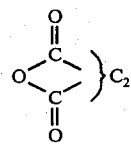

(III-b)

was added, and the mixture was treated in the same way as in (1-b) and (1-c) of Example 1.

The infrared absorption spectra and visible absorption spectra of the resulting yellow powdery products were examined, and the results are shown in Table 2.

The products were found to have the following structure:

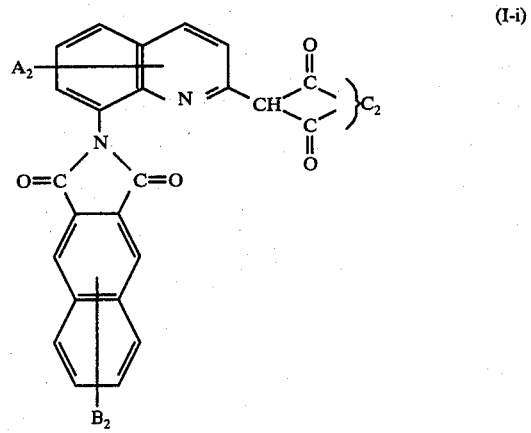

(I-i)

In the above formulae (IV-b), (V-b), (III-b) and (I-i), the symbols $A_2$, $B_2$ and $C_2$ are as shown in Table 2.

Table 2

| Example | $A_2$ | $B_2$ | $C_2$ | IR characteristic absorptions (cm$^{-1}$) | Absorption maximum in the visible region [$\lambda$max (m$\mu$)] |
|---|---|---|---|---|---|
| 15 | —H | —H | tetrachloro-phenylene | 1770, 1730 1670, 1640 | 444 |
| 16 | " | 5,8-dibromo | " | 1780, 1740 1680, 1630 | 445 |
| 17 | " | tetra-bromo | " | 1780, 1730 1670, 1630 | 445 |

Table 2-continued

| Example | $A_2$ | $B_2$ | $C_2$ | IR characteristic absorptions $(cm^{-1})$ | Absorption maximum in the visible region $[\lambda max (m\mu)]$ |
|---|---|---|---|---|---|
| 18 | " | 5,8-dibromo | tetrabromo-phenylene | 1770, 1730 1670, 1630 | 445 |
| 19 | " | —H | 2,3-naphthylene | 1770, 1730 1680, 1630 | 457 |
| 20 | " | " | 5,8-dibromo-2,3-naphthylene | 1780, 1730 1670, 1630 | 458 |
| 21 | " | 5,8-dibromo | " | 1790, 1740 1670, 1630 | 458 |
| 22 | 4-methyl | —H | tetrachloro-phenylene | 1790, 1740 1680, 1630 | 440 |

EXAMPLES 23 to 30

An 8-aminoquinaldine derivative of the following formula

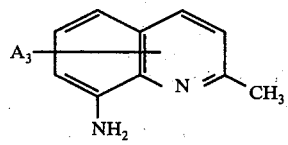
(IV-c)

was reacted with a 1,2-naphthalenedicarboxylic anyhydride of the following formlua

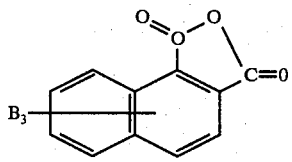
(V-c)

by the same procedure as in (1-a) of Example 1. To the resulting reaction mixture was added a dicarboxylic acid anhydride of the following formula

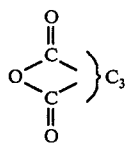
(III-c)

and the mixture was treated in the same way as in (1-b) and (1-c) of Example 1.

The infrared absorption spectra and the visible absorption spectra of the resulting yellow powdery products were examined, and the results are shown in Table 3.

The products were found to have the following structure:

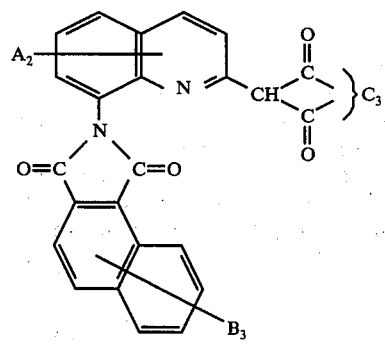
(I-j)

In the above formulae (IV-c), (V-c), (III-c), and (I-j), $A_3$, $B_3$ and $C_3$ are as indicated in Table 3.

Table 3

| Example | $A_3$ | $B_3$ | $C_3$ | IR characteristic absorptions $(cm^{-1})$ | Absorption maximum in the visible region $[\lambda max (m\mu)]$ |
|---|---|---|---|---|---|
| 23 | —H | —H | tetrachloro-phenylene | 1780, 1720 1680, 1630 | 444 |
| 24 | " | " | tetrabromo-phenylene | 1770, 1720 1670, 1630 | 444 |
| 25 | " | " | 1,2-naphthylene | 1780, 1730 1680, 1630 | 459 |
| 26 | " | 5,8-dibromo | 5,8-dibromo-1,2-naphthylene | 1790, 1740 1680, 1630 | 460 |
| 27 | " | 1H | " | 1780, 1730 1680, 1630 | 460 |
| 28 | " | " | 2,3-naphthylene | 1780, 1730 1680, 1630 | 459 |
| 29 | " | " | 5,8-dibromo-2,3-naphthylene | 1780, 1740 1680, 1630 | 460 |
| 30 | 4-methyl | " | tetrachloro-phenylene | 1790, 1740 1680, 1630 | 440 |

EXAMPLES 31 AND 32

158 parts of 8-aminoquinaldine of the following formula

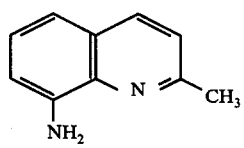

was reacted with 226 parts of 2,2'-bisphenyldicarboxylic acid anhydride of the following formula

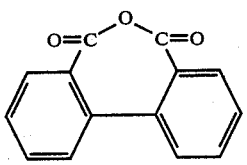

in 2000 parts of α-chloronaphthalene at about 190° C by the same procedure as in (1-a) of Example 1. To the resulting reaction mixture was added a dicarboxylic acid anhydride of the following formula

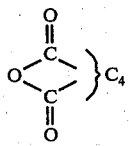

(III-d)

in which $C_4$ is as indicated in Table 4.

The mixture was treated in the same way as in (1-b) and (1-c) of Example 1 without $ZnCl_2$.

The infrared absorption spectra and the visible absorption spectra of the resulting yellow powdery products were examined, and the results are shown in Table 4.

The products had the structure of the following formula:

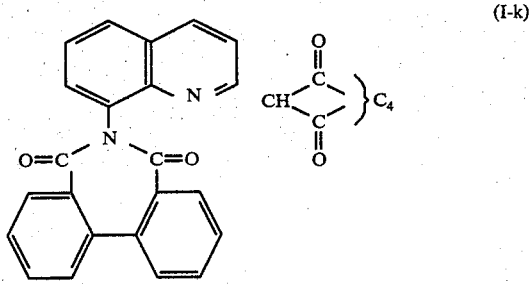

(I-k)

Table 4

| Example | $C_4$ | IR characteristic absorptions (cm$^{-1}$) | Absorption maximum in the visible region [λmax (mμ)] |
|---|---|---|---|
| 31 | tetrachlorophenylene | 1790, 1740, 1670, 1630 | 444 |
| 32 | tetrabromophenylene | 1780, 1730, 1680, 1635 | 428 |

EXAMPLES 33 to 35 AND COMPARATIVE EXAMPLE 1

The powdery pigments shown in Table 5 below were prepared in the same way as in Example 1. 0.3 Part of each of the pigments was mixed with 200 parts of a polyethylene resin, and the mixture was kneaded and extruded at 230° C by a melt-extruder to form yellow pellets.

The pellets were injection-molded under the conditions shown in Table 5 to form molded plates. The color difference ΔE of the molded plates was measured using a Lab system of uniform chromaticity scale by means of a color difference meter. The standard used was a molded plate obtained by injection molding at 240° C for 1 minute, and the color difference values shown in Table 5 are relative values when the color difference value of the standard specimen is taken as 0.

Table 5

| Example | Quinoline derivative | ΔE | Temperature (° C) 240 / Time (min) 1 | 240 / 5 | 260 / 5 | 280 / 5 | 300 / 5 |
|---|---|---|---|---|---|---|---|
| 33 | 2-(4',5',6',7'-tetrachloro-1',3'-indanedionyl-2')-8-naphthalimidoquinoline | | 0 | +0.51 | +1.42 | +2.36 | +5.21 |
| 34 | 2-(4',5',6',7'-tetrachloro-1',3'-indanedionyl-2')-8-(4'-bromonaphthalimido) quinoline | | 0 | +0.41 | +1.35 | +2.25 | +5.13 |
| 35 | 2-(4',5',6',7'-tetrachloro-1',3'-indanedionyl-2')-8-(tetrabromonaphthalene-2',3'dicarboximido) quinoline | | 0 | +0.60 | +1.52 | +3.20 | +6.52 |
| Comp. Ex. 1 | 2-(4',5',6',7'-tetrachloro-1',3'-indanedionyl-2')-8-tetrachlorophthalimidoquinoline | | 0 | +1.24 | +2.51 | +8.26 | +13.95 |

EXAMPLE 36

Each of the powdery pigments obtained in the previous Examples was mixed with the various resins shown in Table 6, and the mixture was melted and injection-molded. The weatherability of the resulting specimens was measured by a carbon arc lamp test using a Weather-O-meter. The results were evaluated by a blue scale. The thermal stability was estimated by visually observing the change of color of the specimen during its injection molding under the conditions shown in Table 6.

The results are shown in Table 6. The figures in the column of pigments are the Example numbers.

Table 6

| | | | Experimental conditions | | | Evaluation | |
|---|---|---|---|---|---|---|---|
| Run No. | Pigment | Amount (%) | Resin | Injection molding conditions Temp. (° C) | Time (min.) | Thermal stability | Weatherability (class) |
| 1 | 1 | 0.1 | Polystyrene | 220–280 | 2 | No discoloration | More than 6 |

Table 6-continued

| Run No. | Pigment | Amount (%) | Resin | Injection molding conditions Temp. (° C) | Time (min.) | Thermal stability | Weatherability (class) |
|---|---|---|---|---|---|---|---|
| 2 | 1 | 0.15 | Polycarbonate | 300 | 2~20 | " | " |
| 3 | 2 | 0.1 | ABS containing 0.5% TiO₂ | 220–280 | 2 | " | " |
| 4 | 2 | 0.1 | Polypropylene containing 0.5% TiO₂ | 230–250 | 10–30 | " | — |
| 5 | 14 | 0.1 | Polystyrene | 220–280 | 2 | " | More than 6 |
| 6 | 19 | 0.1 | " | " | " | " | — |
| 7 | 15 | 0.1 | " | " | " | " | — |
| 8 | 14 | 0.15 | Polycarbonate | 300 | 2~20 | " | More than 6 |
| 9 | 17 | 0.1 | ABS (containing 0.5% TiO₂) | 220–280 | 2 | " | " |
| 10 | 17 | 0.1 | Polypropylene containing 0.5% TiO₂ | 230–250 | 10–30 | " | — |
| 11 | 22 | 0.2 | Polystyrene | 220–280 | 2 | " | — |
| 12 | 26 | 0.2 | Polystyrene | " | " | " | — |
| 13 | 22 | 0.15 | Polycarbonate | 300 | 2~20 | " | More than 6 |
| 14 | 23 | 0.1 | ABS | 220–280 | 2 | " | " |
| 15 | 23 | 0.1 | Polypropylene containing 0.5% TiO₂ | 230–250 | 10–30 | " | — |
| 16 | 30 | 0.1 | Polystyrene | 220–280 | 2 | " | More than 6 |
| 17 | 30 | 0.15 | Polycarbonate | 300 | 2~20 | " | " |
| 18 | 31 | 0.1 | ABS | 220–280 | 2 | " | " |
| 19 | 1 | 0.15 | Polyethylene | 240–280 | 5 | " | " |
| 20 | 14 | 0.15 | " | " | " | " | " |

EXAMPLE 37

Two parts of a quinophthalone pigment of the following formula

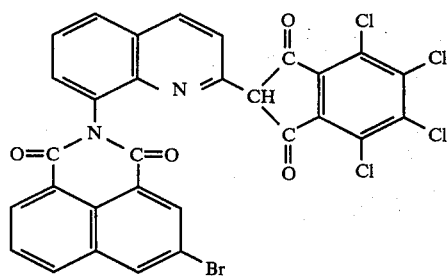

and 300 parts of di-(2-ethylhexyl) phthalate were mixed with 700 parts of a polyvinyl chloride resin, and the mixture was kneaded at 155° to 160° C by means of two rolls to form a yellow sheet having good thermal stability and weatherability and superior resistance to migration.

EXAMPLE 38

One part of a quinophthalone compound of the following structure

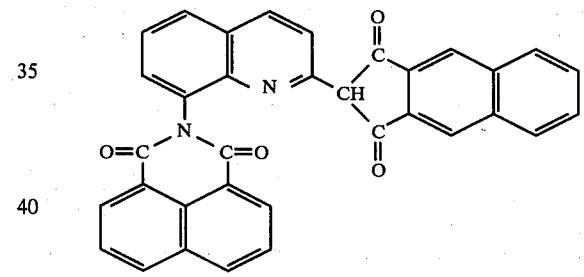

was uniformly dispersed in 3,000 parts of water containing 3 parts of sodium higher alkylbenzenesulfonate, and 4 parts of o-phenylphenol was added to form a dye bath.

100 Parts of polyester fibers were dipped in the resulting dye bath, and dyed at 100° to 120° C for 2 hours. After dyeing, the fibers were washed with water and soaped with 3,000 parts of water containing 4 parts of a sulfuric acid ester of a high alcohol to afford a yellow dyeing.

The above procedure was repeated using a quinophthalone compound of the following structural formula

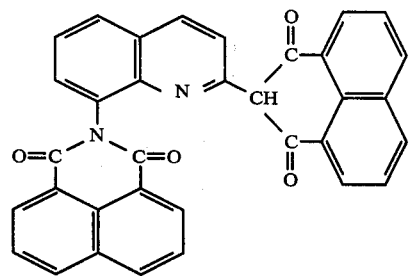

to afford a greenish yellow dyeing of polyester fibers.

EXAMPLE 39

0.5 part of a quinophthalone pigment of the following formula

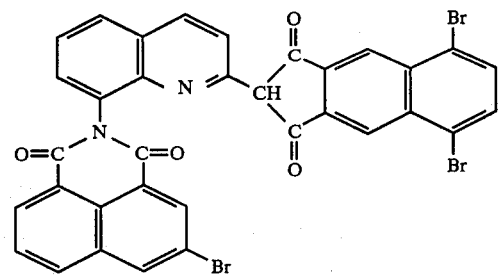

was added to 500 parts of a methyl methacrylate syrup which had been pre-polymerized. The colored syrup was poured into a glass cell, and polymerized at 50° to 70° C for 6 hours, and then at 100° to 120° C for 3 hours. The product was cooled, and removed to afford a tough yellow poly(methyl methacrylate) plate.

EXAMPLE 40

One part of the same quinophthalone pigment prepared in Example 1, 386 parts of calcium carbonate, 4 parts of zinc stearate, 25 parts of a styrene monomer, and 35 parts of a finely divided polystyrene were mixed with a ball mill, and 300 parts of glass fibers, 240 parts of an isophthalic acid-type unsaturated polyester resin, and 10 parts of calcium hydroxide were added. A polymerization initiator was added, and the mixture was heat formed at 180° C. A reinforced polyester article vividly colored yellow was obtained.

EXAMPLE 41 AND COMPARATIVE EXAMPLE 2

1.5 Parts of each of 2-(4',5',6',7'-tetrachloro-1',3'-indanedionyl-2')-8-naphthalimidoquinoline and 2-(4',5',6',7'-tetrachloro-1',3'-indanedionyl-2')-8-tetrachloro-phthalimidoquinoline prepared in the same way as in Example 1 was mixed with 1000 parts of a polyethylene resin, and 4 parts of zinc stearate was added. The mixture was mixed and extruded by a melt extruder at 230° C to afford yellow pellets.

The pellets were injection-molded under the conditions shown in Table 7 to form molded plates. These molded plates were tested in the same way as in Examples 33 to 35. The results are shown in Table 7.

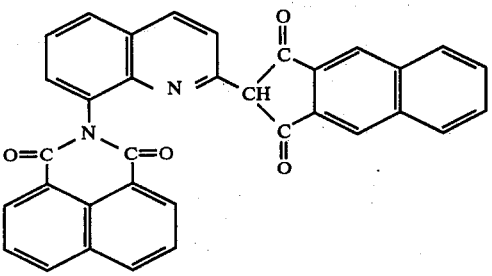

was produced in the same way as in Example 1 except that 198 parts of 2,3-naphthalenedicarboxylic acid was used instead of 286 parts of tetrachlorophthalic anhydride. 52 parts of the resulting compound was dispersed in 1,000 parts of water, and 1 part of iodine was added. The mixture was heated to 90° to 95° C, and with uniform stirring, 64 parts of bromine was added dropwise. The reaction was continued for an additional 3 hours. The product was cooled, separated by filtration, and washed with methanol and water to afford a product of the following formula having two bromine atoms introduced thereinto.

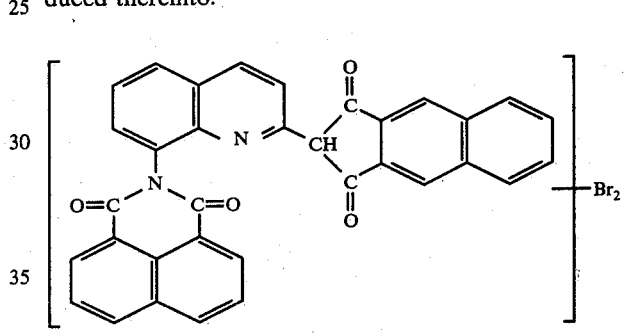

The elemental analysis values, determined and shown in Table 8 below, substantially corresponded with those calculated under the assumption that two bromine atoms were introduced.

Table 8

|            | C (%) | H (%) | N (%) | Br (%) |
|------------|-------|-------|-------|--------|
| Found      | 60.44 | 2.44  | 4.19  | 23.50  |
| Calculated | 60.38 | 2.38  | 4.14  | 23.63  |

What we claim is:
1. A compound of the formula

Table 7

| Run No. | Quinoline derivative | ΔE | Temperature (° C) 240 / Time (min) 1 | 240 / 5 | 260 / 5 | 280 / 5 | 300 / 5 |
|---|---|---|---|---|---|---|---|
| Example 41 | 2-(4',5',6',7'-tetrachloro-1',3'-indanedionyl-2')-8-naphthalimido-quinoline | | 0 | + 0.32 | + 1.15 | + 2.16 | + 5.50 |
| Comp. Ex. 2 | 2-(4',5',6',7'-tetrachloro-1',3'-indanedionyl-2')-8-tetrachloro-phthalimidoquinoline | | 0 | + 1.42 | + 5.85 | +15.79 | +43.41 |

EXAMPLE 42

A compound of the following structural formula

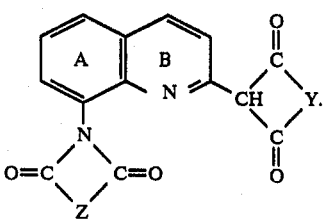

wherein Y represents 1,2-phenylene, 1,2-naphthylene, 2,3-naphthylene or 1,8-naphthylene which are unsubstituted or substituted by halogen, benzenesulfonyl, p-toluenesulfonyl, p-chlorobenzenesulfonyl, p-bromobenzenesulfonyl or an acyl group of the formula R—CO— or —CO—R'—CO— where R is a monovalent hydrocarbon group containing up to 10 carbon atoms and R' is a divalent hydrocarbon group containing up to 10 carbon atoms, Z represents 1,8-naphthylene which is unsubstituted or substituted by halogen, and rings A and B, independently of each other, are unsubstituted or substituted by a substituent selected from the group consisting of halogen, lower alkyl, lower alkoxy and phenyl.

2. The compound of claim 1 wherein the rings A and B are unsubstituted.

3. The compound of claim 1 wherein Y is tetrahalo-1,2-phenylene.

4. The compound of claim 1 wherein Y is 1,2-phenylene, 1,2-naphthylene, 2,3-naphthylene or 1,8-naphthylene substituted by 1 to 6 halogen atoms selected from the group consisting of chlorine and bromine.

5. The compound of claim 1 wherein Z is 1,8-naphthylene which is unsubstituted or substituted by 1 to 4 halogen atoms selected from the group consisting of chlorine and bromine.

6. The compound of claim 1 wherein said substituent for the rings A and B is located on at least one of positions 4-, 5- and 6- of the quinoline ring.

7. The compound of claim 1 wherein said substituent for rings A and B is halogen or lower alkyl.

8. A compound of the formula

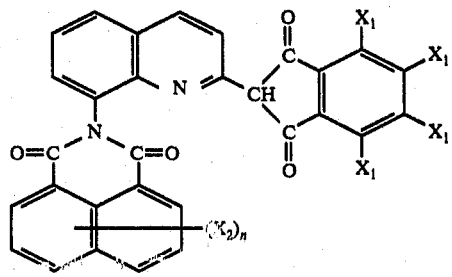

wherein $X_1$ and $X_2$, independently of each other, represent halogen, and $n$ is an integer of 0 to 6.

9. The compound of claim 8 wherein said halogen is chlorine or bromine.

10. The compound of claim 9 wherein $n$ is an integer of 0 to 4.

* * * * *